United States Patent [19]

Stacey

[11] Patent Number: 5,703,767
[45] Date of Patent: Dec. 30, 1997

[54] APPARATUS AND METHOD TO PREVENT SATURATION OF INTERPHASE TRANSFORMERS

[75] Inventor: Eric J. Stacey, Pittsburgh, Pa.

[73] Assignee: Electric Power Research Institute, Inc., Palo Alto, Calif.

[21] Appl. No.: 631,185

[22] Filed: Apr. 12, 1996

[51] Int. Cl.⁶ .................................. H02M 1/12
[52] U.S. Cl. .............................. 363/40; 363/71
[58] Field of Search .................. 363/40, 41, 42, 363/43, 71

[56] References Cited

U.S. PATENT DOCUMENTS

| | | | |
|---|---|---|---|
| 3,628,123 | 12/1971 | Ross | 321/9 R |
| 3,876,923 | 4/1975 | Humphrey et al. | 321/27 R |
| 3,958,173 | 5/1976 | Christianson et al. | 321/45 C |
| 3,967,173 | 6/1976 | Stich | 363/40 |
| 4,847,745 | 7/1989 | Shekhawat et al. | 363/132 |
| 4,870,557 | 9/1989 | Stacey | 363/43 |
| 5,027,265 | 6/1991 | Dhyanchand et al. | 363/37 |
| 5,138,544 | 8/1992 | Jessee | 363/43 |
| 5,168,437 | 12/1992 | Gyugyi et al. | 363/42 |
| 5,212,629 | 5/1993 | Jessee | 363/42 |
| 5,337,227 | 8/1994 | Stacey et al. | 363/71 |
| 5,355,299 | 10/1994 | Carpita | 363/95 |
| 5,515,264 | 5/1996 | Stacey | 363/132 |

OTHER PUBLICATIONS

Humphrey, et al., "Inverter Paralleling Reactors", Conference Record of IEEE International Semiconductor Power Converter Conference, May 1972, pp. 2–4–1 to 2–4–6.
Walker, "10 –MW GTO Converter for Battery Peaking Service", IEEE Transactions on Industry Applications, vol. IA–26, No. 1, 1990, pp. 63–72.

*Primary Examiner*—Matthew V. Nguyen
*Attorney, Agent, or Firm*—Flehr Hohbach Test Albritton & Herbert LLP; William S. Galliani

[57] ABSTRACT

The saturation of interphase transformers connected to an inverter is prevented through the use of an inverter switch firing control circuit. The inverter switch firing control circuit includes a control module to execute a standard switch firing scheme to produce a set of inverter pole output signals including a first inverter pole output signal and a second inverter pole output signal, with the first inverter pole output signal having a predetermined phase displacement from the second inverter pole output signal. The circuit also includes a control module to execute a system transient switch firing scheme wherein the inverter reduces the predetermined phase displacement between the first inverter pole output signal and the second inverter pole output signal in the presence of a system transient. This reduction in phase displacement between inverter pole output signals prevents saturation of interphase transformers. Thus, the size, cost, and weight of interphase transformers may be substantially reduced.

14 Claims, 12 Drawing Sheets

SEE FIG. 13B

APPARATUS AND METHOD TO PREVENT SATURATION OF INTERPHASE TRANSFORMERS

BRIEF DESCRIPTION OF THE INVENTION

This invention relates generally to devices used to control power distribution. More particularly, this invention relates to operating a voltage sourced inverter so as to prevent saturation of interphase transformers connected to the voltage sourced inverter.

BACKGROUND OF THE INVENTION

Harmonic neutralized voltage sourced inverters are being developed for electric power transmission and distribution systems. These devices have a set of switches that are used to convert a dc voltage signal into discretely displaced square waveforms. The waveforms are subsequently combined to produce a high quality sinusoidal output signal.

Interphase transformers have been used to combine the waveforms and simultaneously reduce harmonics in the resultant sinusoidal signal. In steady state operation, the waveforms applied to an interphase transformer have no dc component and therefore the magnetic flux in the interphase transformer has a mean value of zero. However, during system transients, broadly referred to herein to include system disturbances and system start-up conditions, the interphase transformer core is susceptible to large flux shifts, sometimes producing one-sided saturation of an interphase transformer core. The saturation of an interphase transformer core prevents it from supporting voltage, which can result in damage to an inverter as individual poles of the inverter become overloaded.

In order to prevent magnetic saturation, interphase transformers can be designed to reduce flux density. In particular, they can be designed with ratings approximately three times larger than that required for normal operation. Unfortunately, the high device ratings result in large, heavy, and expensive interphase transformers. Consequently, it would be highly desirable to develop a system to reduce the size, weight, and expense of interphase transformers.

SUMMARY OF THE INVENTION

The invention is an inverter switch firing control circuit to limit the flux and prevent the saturation of interphase transformers connected to a harmonic neutralized inverter. The inverter switch firing control circuit includes a control module to execute a standard switch firing scheme to produce a set of inverter pole output signals including a first inverter pole output signal and a second inverter pole output signal, with the first inverter pole output signal having a predetermined phase displacement from the second inverter pole output signal. The circuit also includes a control module to execute a system transient switch firing scheme wherein the inverter reduces the predetermined phase displacement between the first inverter pole output signal and the second inverter pole output signal in the presence of a system transient. This reduction in phase displacement between inverter pole output signals prevents saturation of interphase transformers. Thus, the size, cost, and weight of interphase transformers may be substantially reduced.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
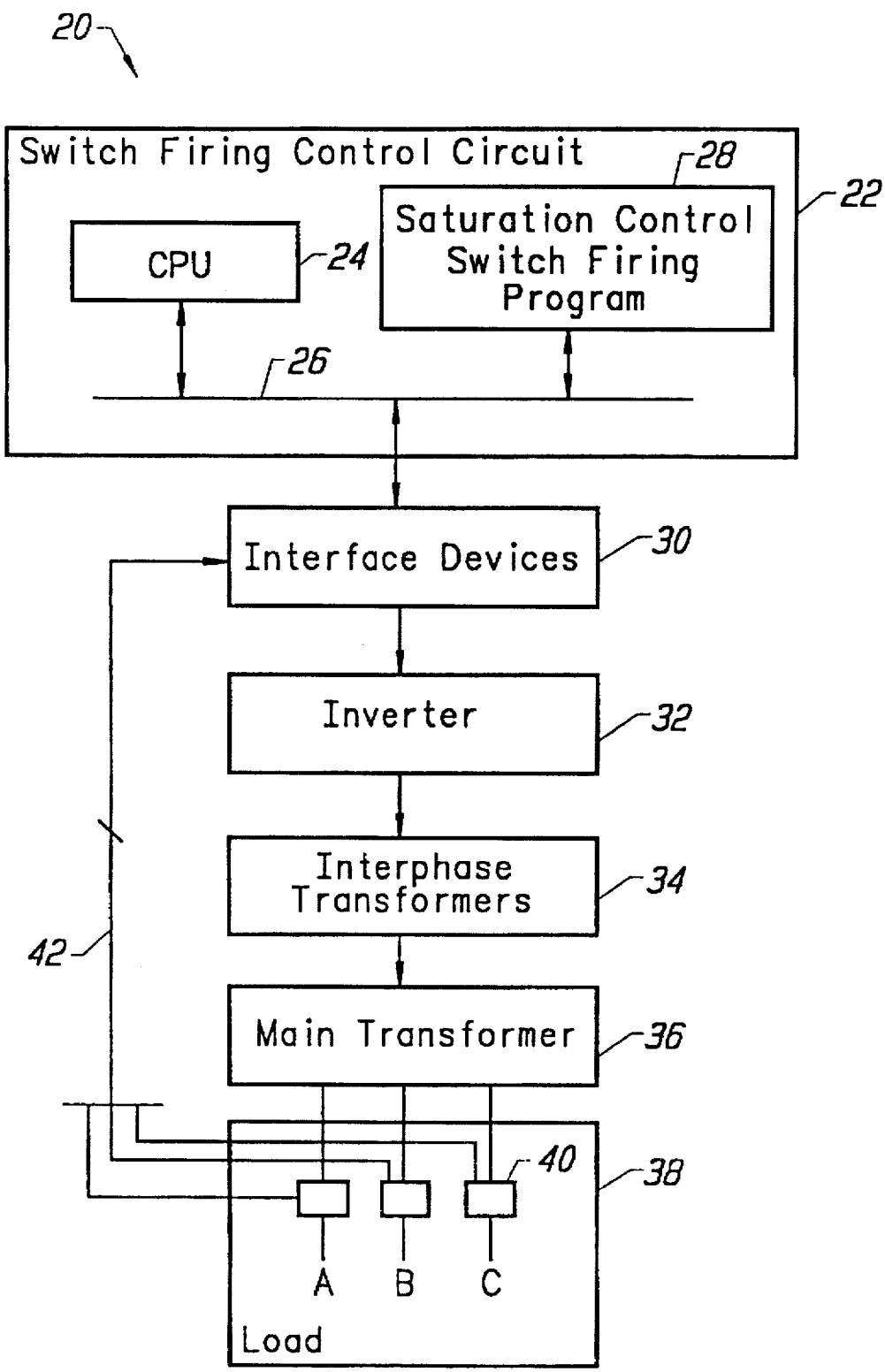
FIG. 1 illustrates a power control circuit incorporating the switch firing control circuit of the invention.

FIG. 1 illustrates a power distribution control system 20 incorporating the technology of the present invention. The system 20 includes a switch firing control circuit 22 that is used to fire the gates of an inverter 32 such that the output waveforms from the inverter do not saturate the cores of a set of interphase transformers 34. More particularly, the switch firing control circuit 22 is used to generate non-saturating inverter output waveforms during system transients. As a consequence of this approach, the interphase transformers 34 can be constructed with reduced size, weight, and expense.

The switch firing control circuit 22 may be implemented with a central processing unit (CPU) 24 connected via a bus 26 to a memory, which stores a saturation control switch firing program 28. The CPU 24 executes the saturation control switch firing program 28 to generate a set output signals. The saturation control switch firing program 28 may be executed without relying upon the CPU 24. For example, in alternate embodiments, the program 28 is embedded in silicon or it is hardwired.

Regardless of the implementation, the output signals from the saturation control switch firing program 28 are applied to interface devices 30. Interface devices 30 refer to any interface that is used between a low voltage control circuit and a high power device such as inverter 32. The output signals from the saturation control switch firing program 28 are processed by the interface devices 30 and are subsequently used to fire the switches of the inverter 32. The inverter 32 generates a set of inverter pole output signals that are applied to a set of interphase transformers 34. The interphase transformers 34 combine the inverter pole output signals (waveforms) to attenuate or reduce particular harmonic components and thereby improve signal quality. In the exemplary system of FIG. 1, the combined inverter pole output signals are applied to a main transformer 36, which processes the signals to generate three-phase signals that are applied to a load 38. The load 38 refers to any standard load or an AC grid.

One or more transducers 40 are connected to the load 38 to identify system disturbances. Each transducer 40 is connected by a bus 42 back to the interface devices 30, allowing a system disturbance signal to be processed by the switch firing control circuit 22.

A general overview has been provided for one circuit topology that may incorporate the technology of the present invention. Attention presently turns to a more detailed consideration of the processing executed by the switch firing control circuit 22, more particularly the processing associated with its saturation control switch firing program 28.

Figure 2:
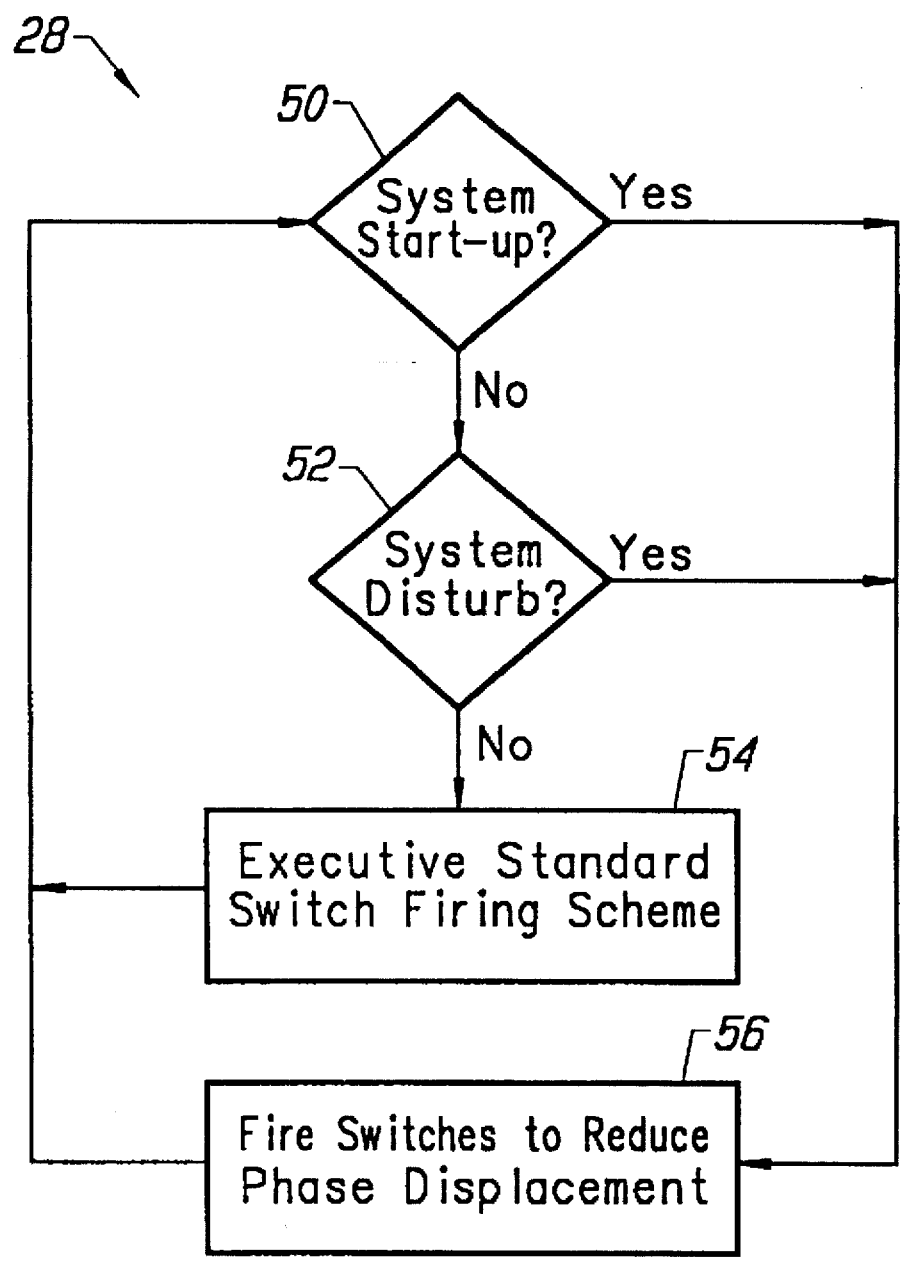
FIG. 2 illustrates processing steps associated with a saturation control switch firing program used in one embodiment of the switch firing control circuit of the invention.

FIG. 2 illustrates one approach to implementing the invention. In particular, the figure illustrates that the switch firing control program 28 can initially assess whether system start-up conditions exist (step 50). If system start-up conditions do not exist, then an inquiry is made to determine whether there is a system disturbance (step 52). If there is no system disturbance, then a standard switch firing scheme is executed (step 54). A standard switch firing scheme is consistent with any number of prior art schemes for firing inverter switches to produce a multi-pulse approximation of a sinusoidal waveform.

If a system start-up condition exists or if there is a system disturbance, then the switches of the inverter are fired to reduce the phase displacement between inverter pole output signals (step 56). In other words, the standard switch firing scheme is abandoned. That is, the steady-state predetermined phase displacement between inverter pole output signals is altered in response to a system transient (either a system start-up condition or a system disturbance). The inverter pole output signals are altered by reducing the steady-state predetermined phase displacement existing between inverter pole output signals, thereby reducing flux. As a consequence, the interphase transformers 34 are not as susceptible to saturation.

Thus, with the technology of the present invention, interphase transformers 34 do not have to be highly rated for transient conditions. Instead of handling transient conditions with large, heavy, and expensive components, the present invention relies upon a readily implemented control technique. Consequently, the interphase transformers 34 can be smaller, lighter, and less expensive.

The system start-up condition assessed at step 50 is readily recognized by any inverter controller. The system disturbance condition assessed at step 50 is based upon measurements for one or more transducers 40 connected to the load 38. Techniques for measuring and processing system disturbances are widely known in the art. Sensors for measuring flux density are also known in the art. Such sensors may be used in implementing a firing strategy to reduce phase displacement, as will be discussed below.

The reduction in inverter pole output signal phase displacement executed at step 56 may be by a predetermined amount. The reduction in phase displacement may be achieved in a single cycle or multiple cycles. In the multiple cycle embodiment, elements of the standard switch firing scheme may be used, between phase-back operations. The rate at which the phase displacement is altered may be tied to measurements made by a flux sensor. That is, the amount and rate of phase displacement may be established in response to flux measurements.

After phase displacement reduction operations are executed, processing returns to decision block 50 where the system start-up condition is tested once again. If system start-up conditions exist (step 50), or if a system disturbance exists (step 52), then the reduction in inverter pole output signal phase displacement is reduced once again. This process is repeated until the system transient has disappeared, at which time the standard switch firing scheme is implemented once again.

The control strategy associated with the invention has now been fully described. A general circuit topology within which to use the control strategy has also been described. Attention presently turns to a more detailed discussion of an exemplary circuit topology and the operation of the invention within that circuit topology.

Figure 3:
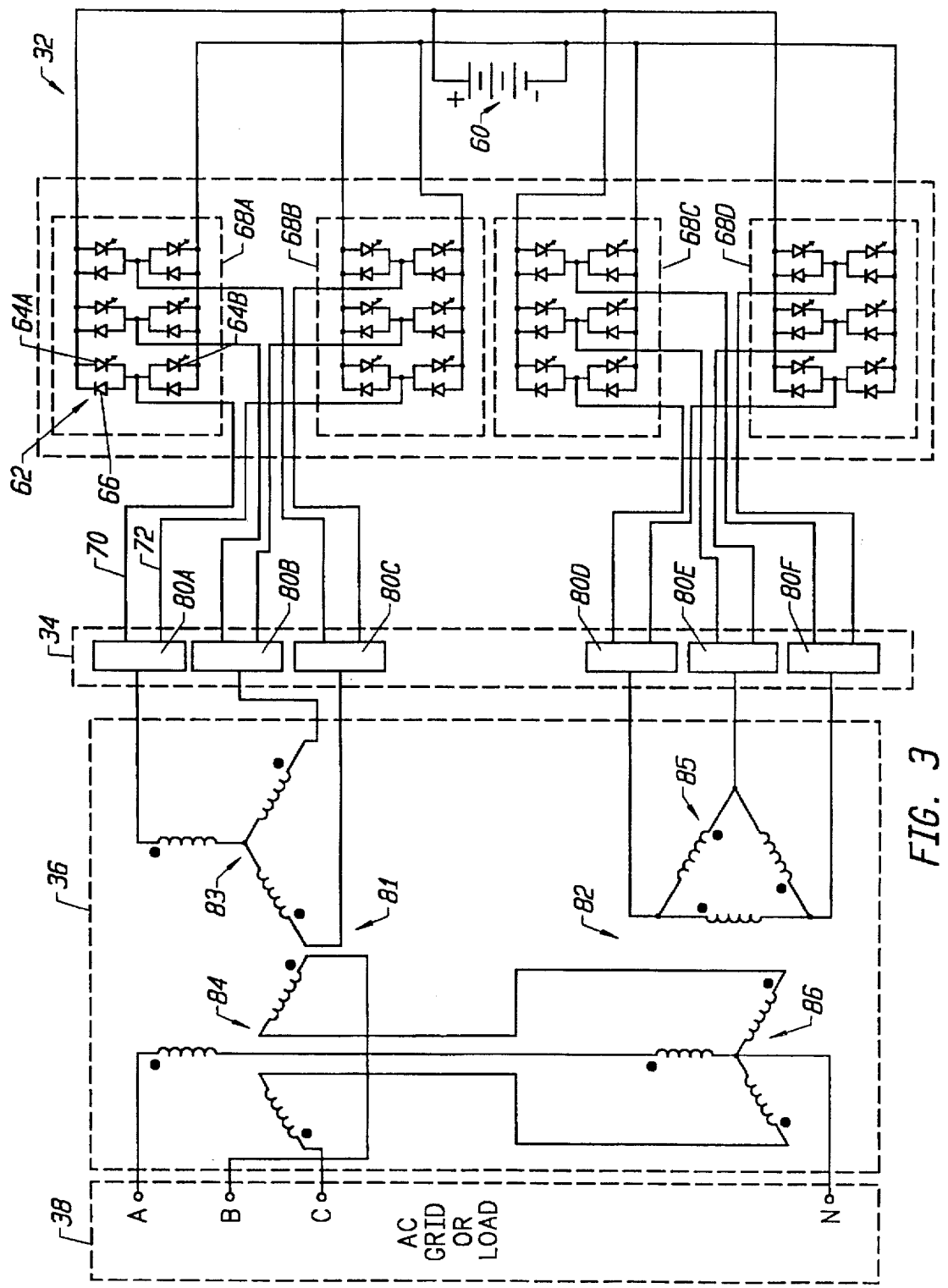
FIG. 3 is a more detailed depiction of selected components of FIG. 1 that may be used in accordance with the invention.

FIG. 3 is a more detailed representation of some of the components of FIG. 1. In particular, the figure shows an inverter 32, a set of interphase transformers 34, a main transformer 36, and a load 38. The inverter 32 includes a dc voltage source 60 and twelve inverter poles 62. Each inverter pole 62 includes a set of switches 64A and 64B. One switch (64A) is connected to the positive node of the dc voltage source 60, while the other switch (64B) is connected to the negative node of the dc voltage source 60. Each switch 64 is typically implemented as a thyristor with an anti-parallel diode 66.

Each switch 64 is turned on and off in response to commands received from the switch firing control circuit 22 (shown in FIG. 1). The inverter poles 62 may be divided into inverter stages 68A–68D.

Figure 4:
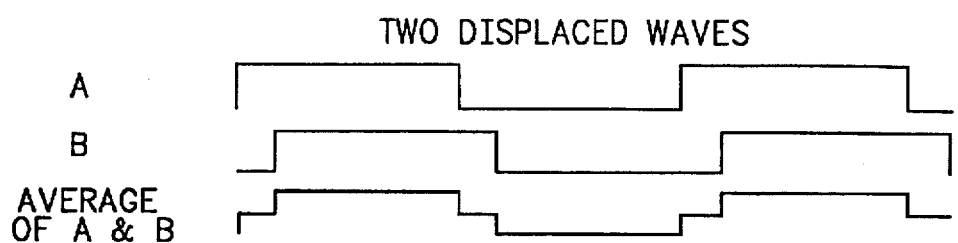
FIG. 4 illustrates the addition of two phase-displaced inverter pole output signals.

As known in the art, each inverter pole 62 is used to "chop" a dc voltage signal from dc power supply 60 into a square wave. By way of example, FIG. 4 illustrates a square wave A, called an inverter pole output signal, formed by inverter pole 62 and carried on line 70. FIG. 4 also illustrates a square wave B formed by another inverter pole and carried on line 72. Note that the inverter pole output signal B of FIG. 4 is phase-displaced from the inverter pole output signal A of FIG. 4.

As known in the art, these phase-displaced inverter pole output signals can be combined by one or more interphase transformers 80 within a set of interphase transformers 34. Each interphase transformer 80 averages the voltage and equalizes the current of the discretely displaced inverter pole output signals applied to it. The result of this operation for two poles is shown in FIG. 4. The combined waveforms from the interphase transformer set 34 are further combined by the main transformer 36.

The main transformer 36 includes a wye/wye transformer 81 and a delta/wye transformer 82. The wye/wye transformer 81 includes wye connected primary windings 83. (Inverter engineer terminology is used herein. To an inverter engineer, the primary windings are on the inverter side of the system, and the secondary windings are on the ac output side of a transformer.) The wye/wye transformer 81 also includes wye connected secondary windings 84. The delta/wye transformer 82 includes delta connected primary windings 85 and wye connected secondary windings 86.

Figure 5:
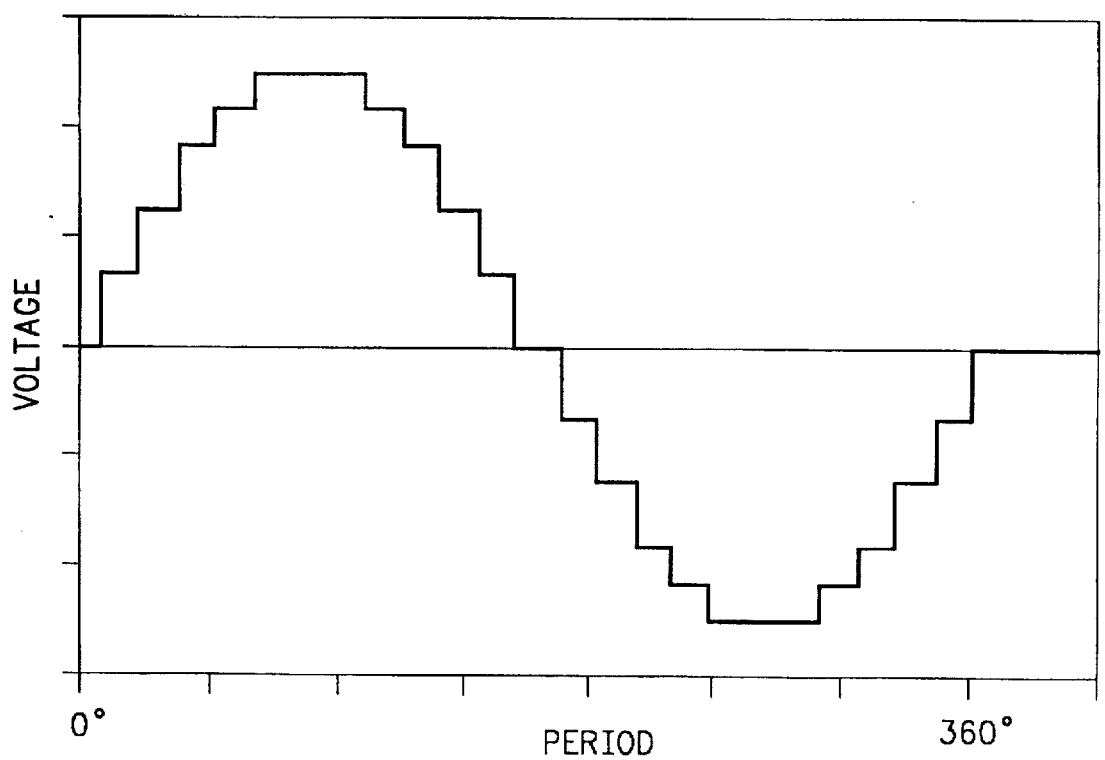
FIG. 5 illustrates a sinusoidal signal generated by a twenty-four pole inverter.

As known in the art, the main transformer 36 combines all of the inverter pole output signals to form a multi-pulse signal. FIG. 5 illustrates a twenty-four pulse signal generated from the twelve poles of inverter 32. This signal appears at node A of the load 38. Identical, but phase-displaced, signals appear at nodes B and C. It can now be appreciated that individual inverter pole output signals can be combined to form a multi-pulse output signal approximating a sinusoidal signal. It can also be appreciated that the larger the number of poles in an inverter, the smoother the resultant output waveform.

Figure 6:
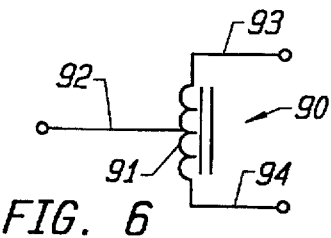
FIGS. 6–12 illustrate different interphase transformers that may be used in conjunction with the invention.
Figure 7:
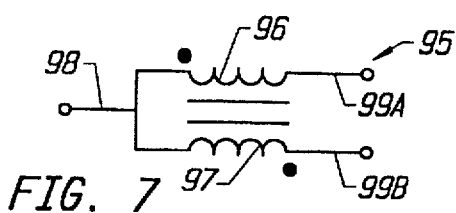

FIGS. 6–12 illustrate different types of interphase transformers that may be used in accordance with the invention. As indicated above, where two or more inverter stages are combined or paralleled, interphase transformers (IPTs) 80 are employed to ensure equalization of the input currents and averaging of the input voltages. Each IPT carries the current contributed by one inverter stage and supports the voltage difference between the inverter stage and the averaged output.

Where only two inverter pole inputs to the IPTs are present, a simple center-tapped IPT 90 may be used, as shown in FIG. 6. The center-tapped IPT 90 has a single winding 91 with a center tap 92 for coupling the IPT 90 with the main transformer 36. Conductors 93 and 94 couple winding 91 across two inverter poles. The center-tapped IPT 90 may also be represented as a standard two input IPT 95 having two identical windings 96 and 97, as shown in FIG. 7. A conductor 98 couples the IPT 95 to the main transformer 36 and conductors 99A and 99B couple the IPT 95 to two inverter poles.

Figure 8:
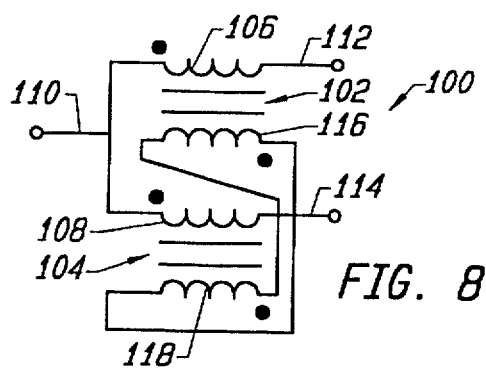

FIG. 8 illustrates a modular two input IPT 100 comprising two modular transformers 102 and 104 with primary windings 106 and 108, respectively. The primary windings 106 and 108 are in parallel and are coupled to the main transformer 36 by a conductor 110. Conductors 112 and 114 couple the respective primary windings 106 and 108 to the inverter 32. The transformers 102 and 104 each have secondary windings 116 and 118 which are connected in series.

Figure 9:
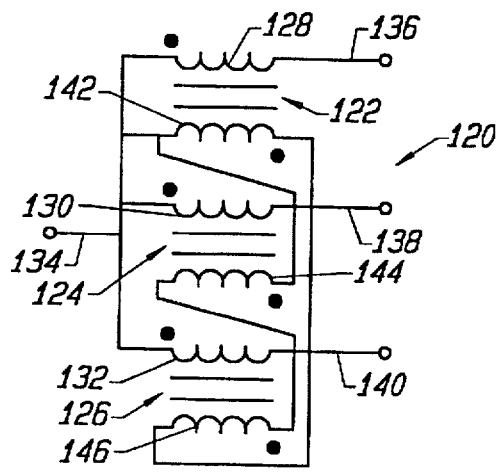

FIG. 9 illustrates a modular three input IPT 120 having three modular transformers 122, 124, and 126. The transformers 122, 124, and 126 have respective primary windings 128, 130, and 132 which are coupled together in parallel and connected by a conductor 134 to the main transformer 36. The primary windings 128, 130, and 132 are coupled to the inverter 32 by the respective conductors 136, 138, and 140. The transformers 122, 124, and 126 each have secondary windings 142, 144, and 146, respectively, which are in series.

Figure 10:
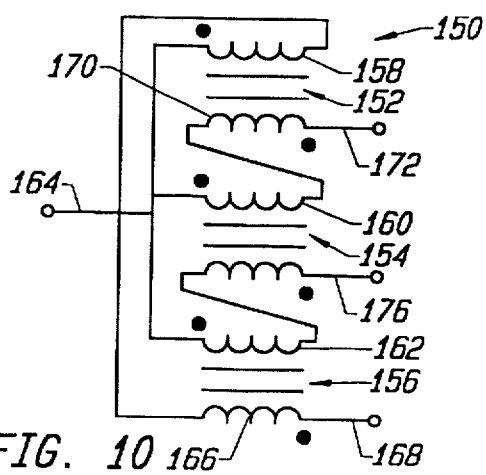

Referring to FIG. 10, a zig-zag three input IPT 150 has three modular transformers 152, 154, and 156. In the zig-zag configuration, the primary of one transformer is connected in series with the secondary of another of the transformers. The transformers 152, 154, and 156 each have primary windings 158, 160, and 162, respectively, which are coupled together and connected to the main transformer 36 by a conductor 164. The primary winding 158 of transformer 152 is in series with a secondary winding 166 of transformer 165, and winding 166 is coupled to the inverter by a conductor 168. The primary winding 160 of transformer 154 is in series with a secondary winding 170 of transformer 152, and winding 170 is coupled to the inverter by a conductor 172. The primary winding 162 of transformer 156 is in series with a secondary winding 174 of transformer 154, and winding 174 is coupled to the inverter by a conductor 176.

Figure 11:
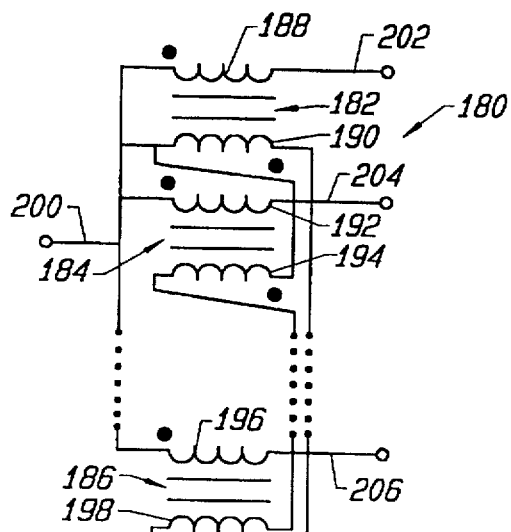

Referring to FIG. 11, the modular concept of FIG. 9 has been expanded into a multi-section modular IPT 180 which has a first modular transformer 182, a second modular transformer 184, and so forth, up to a final Nth modular transformer 186. The first modular transformer 182 has primary and secondary windings 188 and 190; the second modular transformer 184 has primary and secondary windings 192 and 194; and the final Nth modular transformer 186 has primary and secondary windings 196 and 198. Each of the primary windings 188, 192, and 196 are in parallel with one another and coupled by a conductor 220 to the main transformer 36. The primary windings 188, 192, and 196 are coupled to the inverter by conductors 202, 204, and 206, respectively. The secondary windings 190, 192 and 198 are connected in series.

Figure 12:
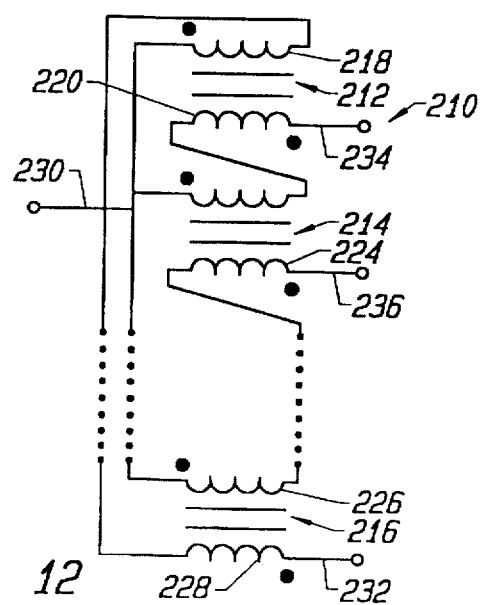

Referring to FIG. 12, the modular zig-zag concept of FIG. 10 has been expanded into a multi-section modular zig-zag IPT 210 which has a first modular transformer 212, a second modular transformer 214, and so forth, up to a final Nth modular transformer 216. The first modular transformer 212 has primary and secondary windings 218 and 220; the second modular transformer 214 has primary and secondary windings 222 and 224; and the final Nth modular transformer 216 has primary and secondary windings 226 and 228. The primary windings 218, 222, and 226 are coupled together and connected to the main transformer 36 by a conductor 230. The primary winding s 218 of transformer 212 is in series with the secondary winding 228 of the final Nth transformer 216, and winding 228 is coupled to the inverter by a conductor 232. The primary winding 222 of transformer 224 is in series with the secondary winding 220 of transformer 212, and winding 220 is coupled to the inverter by a conductor 234. The primary winding 226 of the final transformer 216 is in series with a secondary winding of the N-1 transformer (not shown). The secondary winding 224 of the second transformer is in series with a primary of the third transformer (not shown), and winding 224 is coupled to the inverter by a conductor 236.

Center-tapped IPTs 90 or 95 are particularly useful for combining pairs of inputs, but if only center-tapped IPTs are used, they are limited to combinations of even numbers of inputs. In some applications the center-tapped IPT 90 or 95 may be preferred over a modular approach because the volt-ampere (VA) rating of the center-tapped IPT 90 or 95 is half that of the modular IPT 100. However, the modular approach may be preferred for its flexibility, for example, use of the two, three and other multiple input modular IPTs 100, 120, and 180 may facilitate system design standardization because an identical modular transformer may be coupled to every inverter pole.

Thus, when three or more inverter poles are to be combined, center-tapped, standard, modular or zig-zag IPTs as shown in FIGS. 6–12, or combinations therefor, may be used. Both modular and zig-zag IPTs may actually be considered as modular, since either type of IPT can be provided as separate two winding transformers for each input. For three input IPTs, a wye and delta winding or zig-zag windings on a single three phase core may also be used.

Figure 13A:
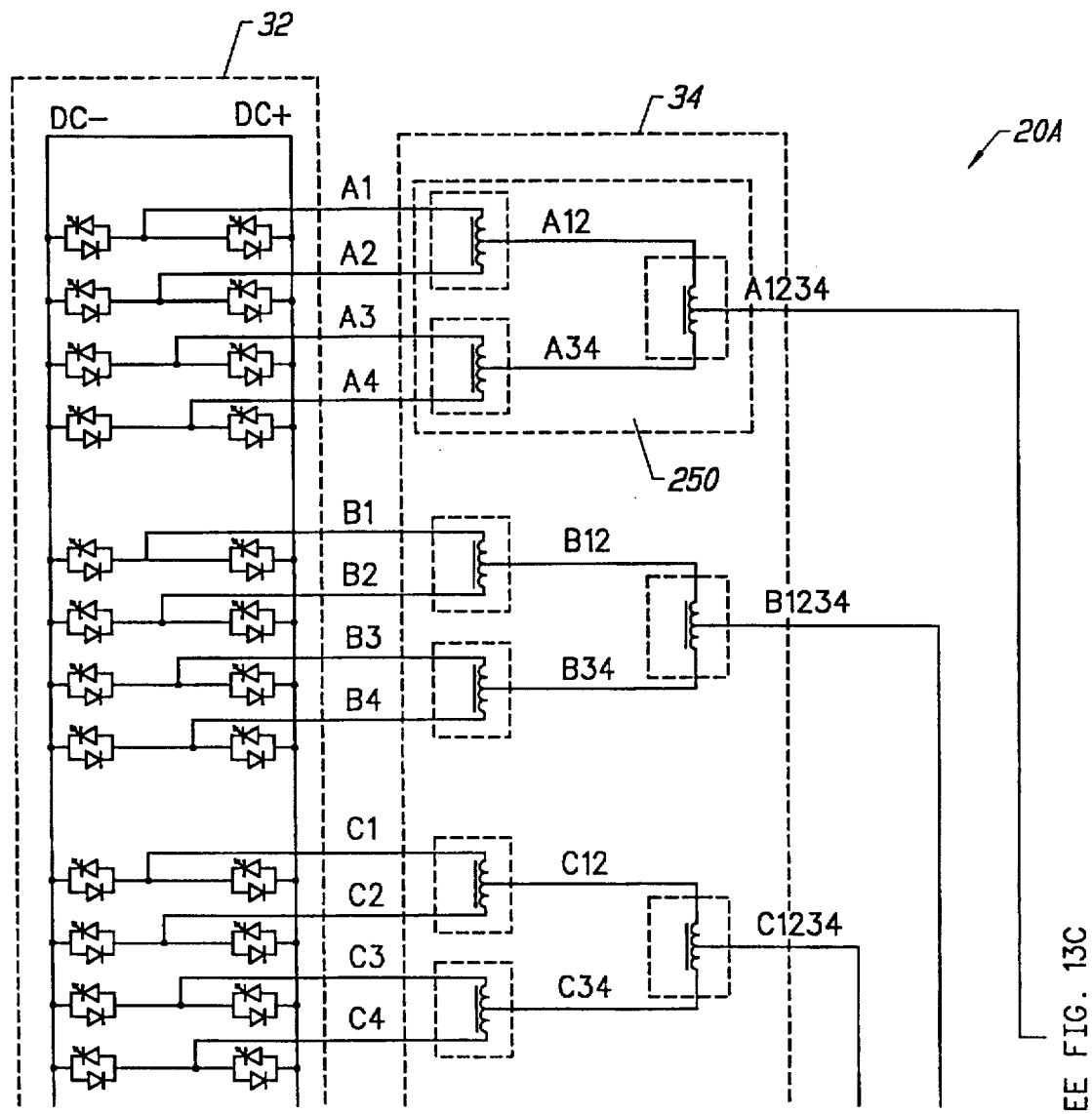
FIG. 13 is a detailed depiction of selected components that may be used in conjunction with the invention.
Figure 13B:
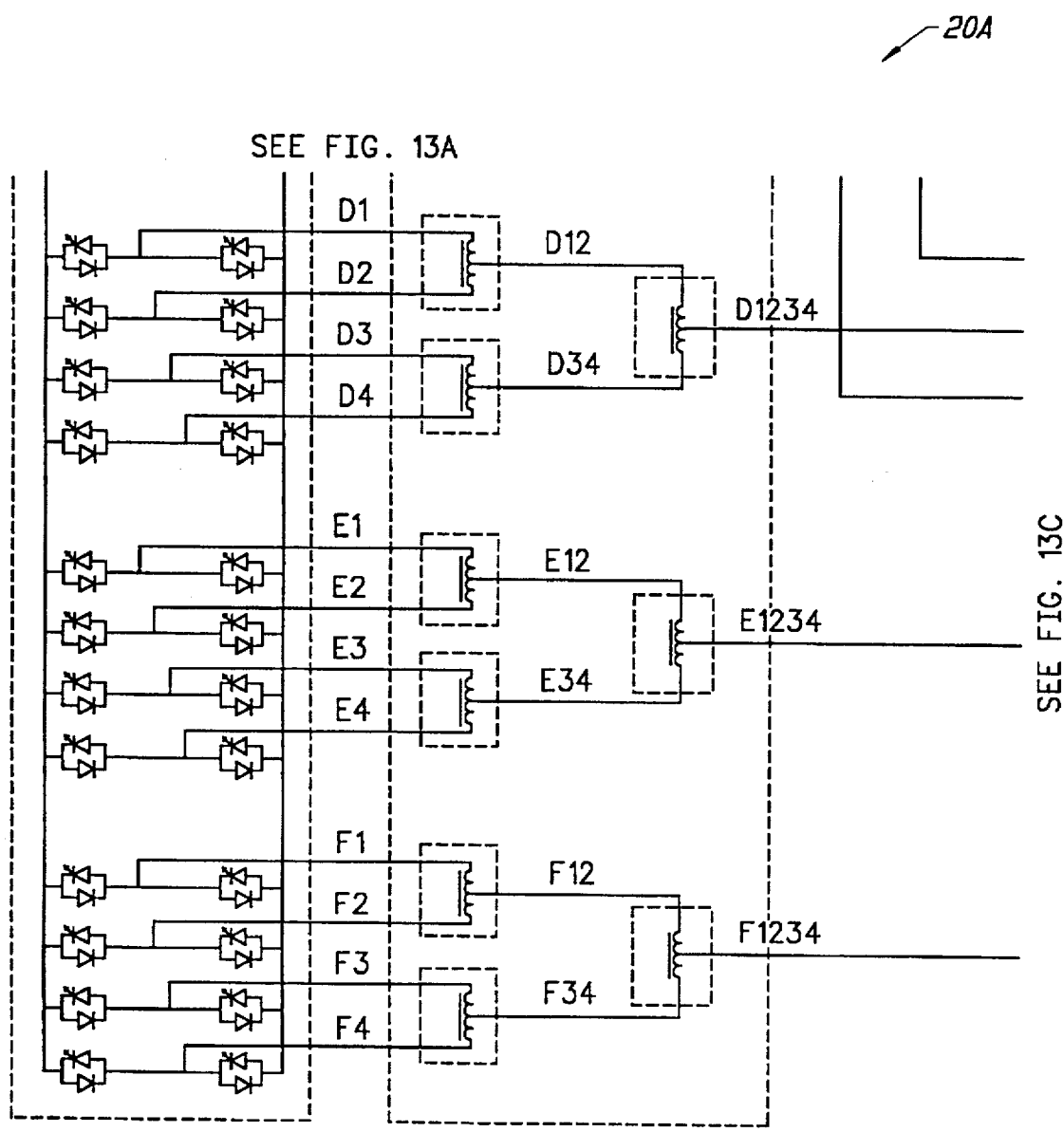
Figure 13C:
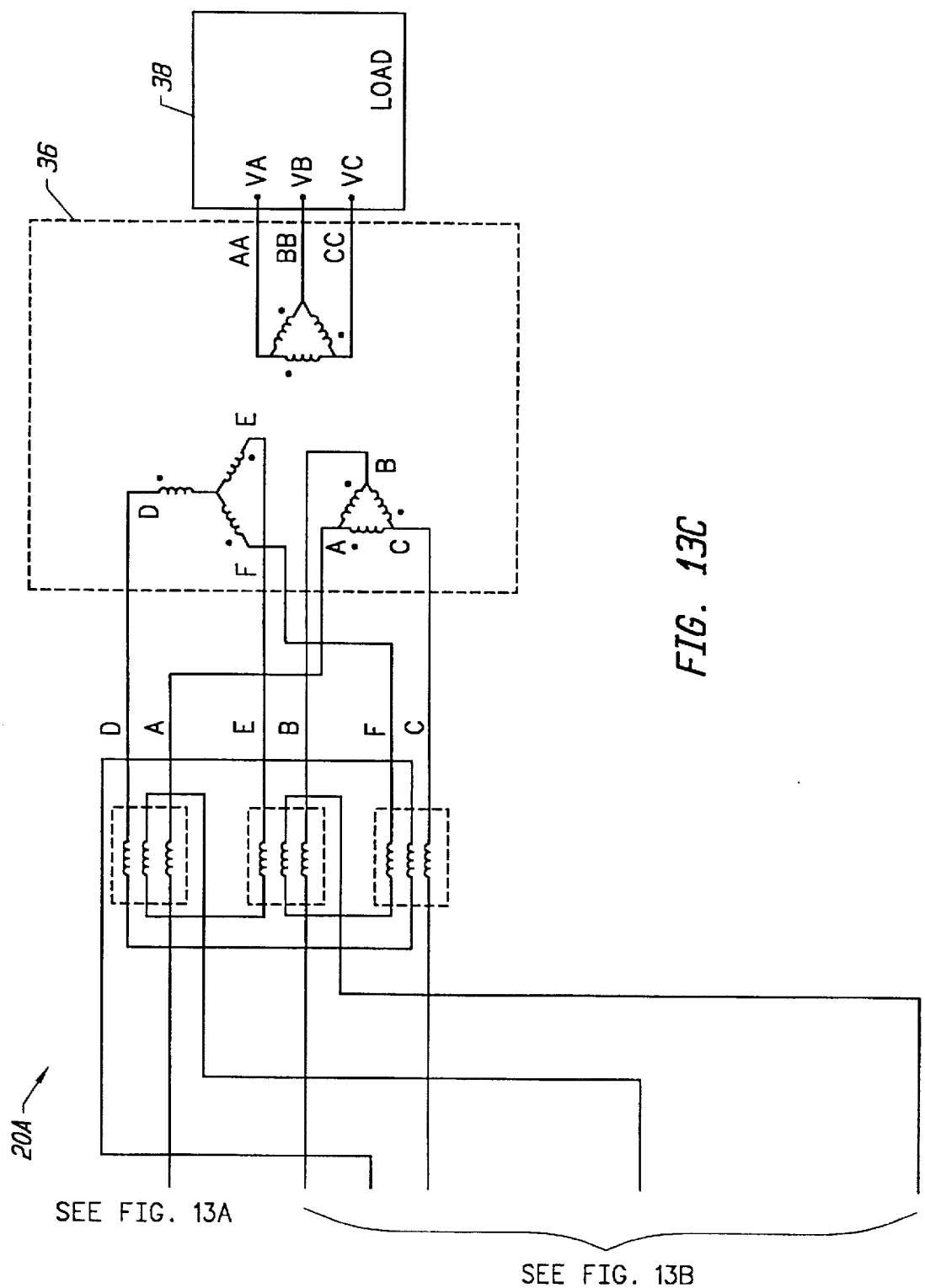

FIG. 13 illustrates an alternate embodiment of a power distribution control system 20A in accordance with the present invention. In particular, FIG. 13 illustrates a forty-eight pulse inverter 32. The output signals from the inverter 32 are delivered to a set of interphase transformers 34 in a staged configuration.

Figure 14:
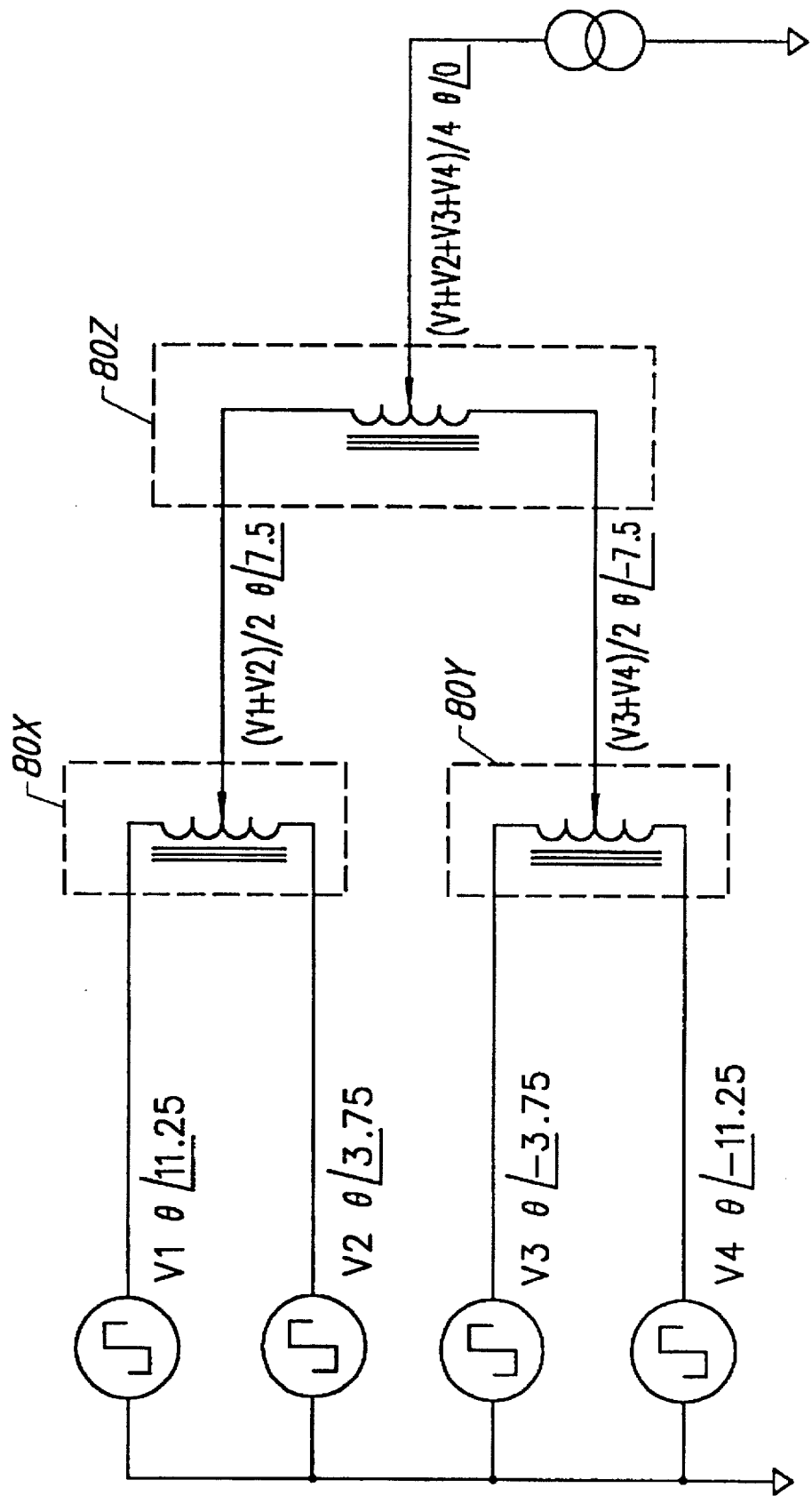
FIG. 14 is an enlarged view of selected components shown in FIG. 13.

FIG. 14 is an enlarged view of the block 250 shown in FIG. 13. FIG. 14 illustrates that during steady-state conditions, the four inverter pole output signals have a phase displacement of 7.5°. Two of the signals are combined at a first minor stage interphase transformer 80X, while the remaining two signals are combined at a second minor stage interphase transformer 80Y. The outputs from the minor stage interphase transformers 80X and 80Y are combined at a major stage interphase transformer 80Z. In sum, the interphase transformers 80X, 80Y, and 80Z produce an output voltage equal to the average of the four phase-displaced inverter pole output signals.

Figure 15:
FIGS. 15–18 illustrate the normal applied voltage and resultant flux associated with the interphase transformers of FIG. 14.
Figure 16:
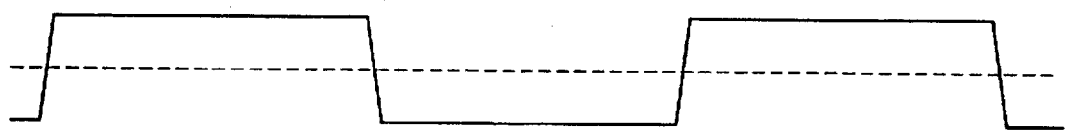
Figure 17:
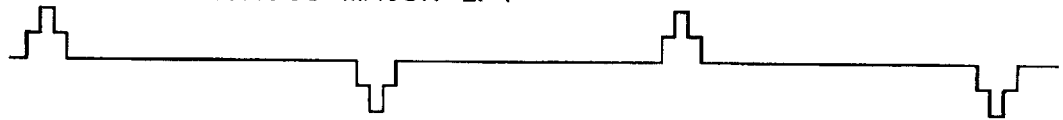
Figure 18:
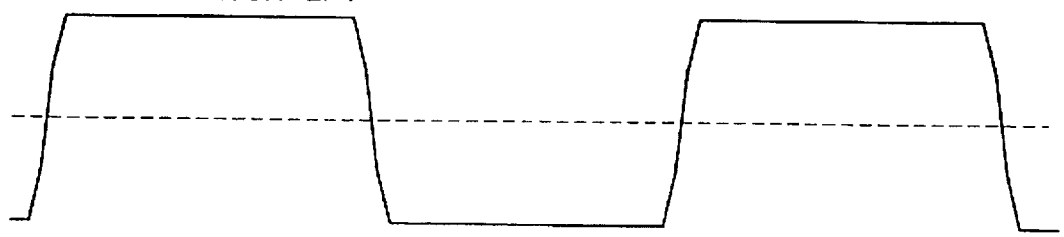

FIG. 15 illustrates the voltage waveform across each minor IPT 80X, 80Y. FIG. 16 illustrates the resultant flux in each minor IPT 80X, 80Y. FIG. 17 illustrates the voltage waveform across the major IPT 80Z, while FIG. 18 illustrates the resultant flux in the major IPT 80Z. Note that the flux only changes in response to the instantaneous voltage applied to an IPT. In accordance with the invention, the change in flux is reduced by reducing the phase displacements between the inverter pole output signals.

Figure 19:
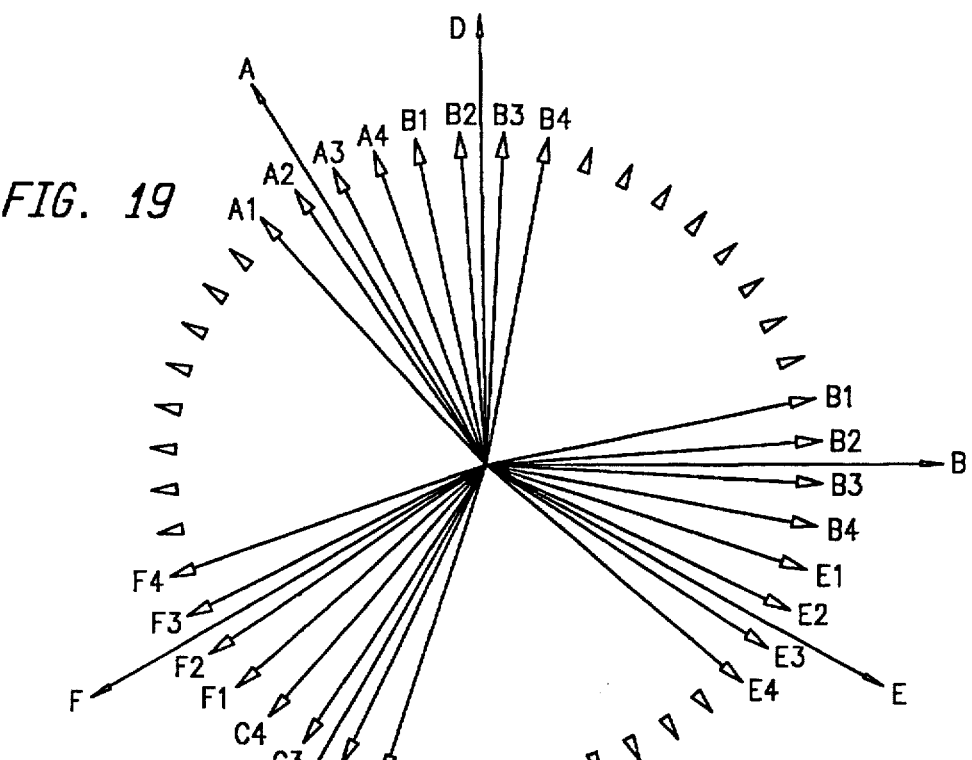
FIGS. 19–21 are vector illustrations showing the reduction of the phase-displacement between inverter pole output signals, in accordance with one embodiment of the invention.
Figure 20:
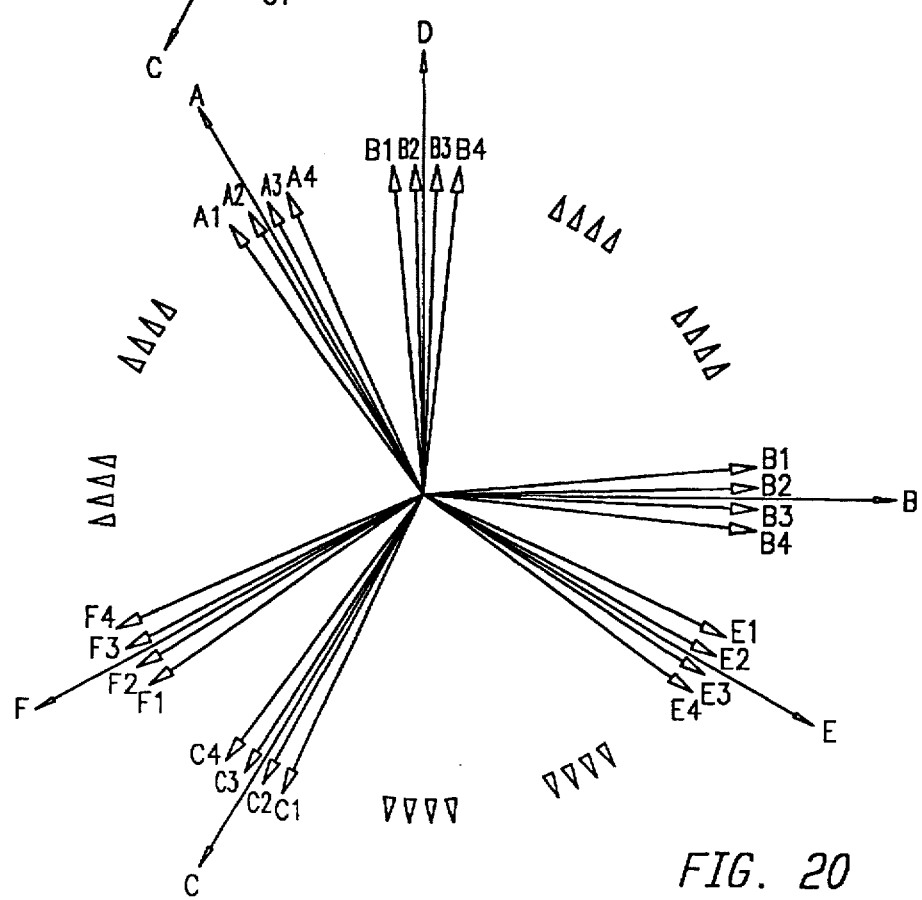
Figure 21:
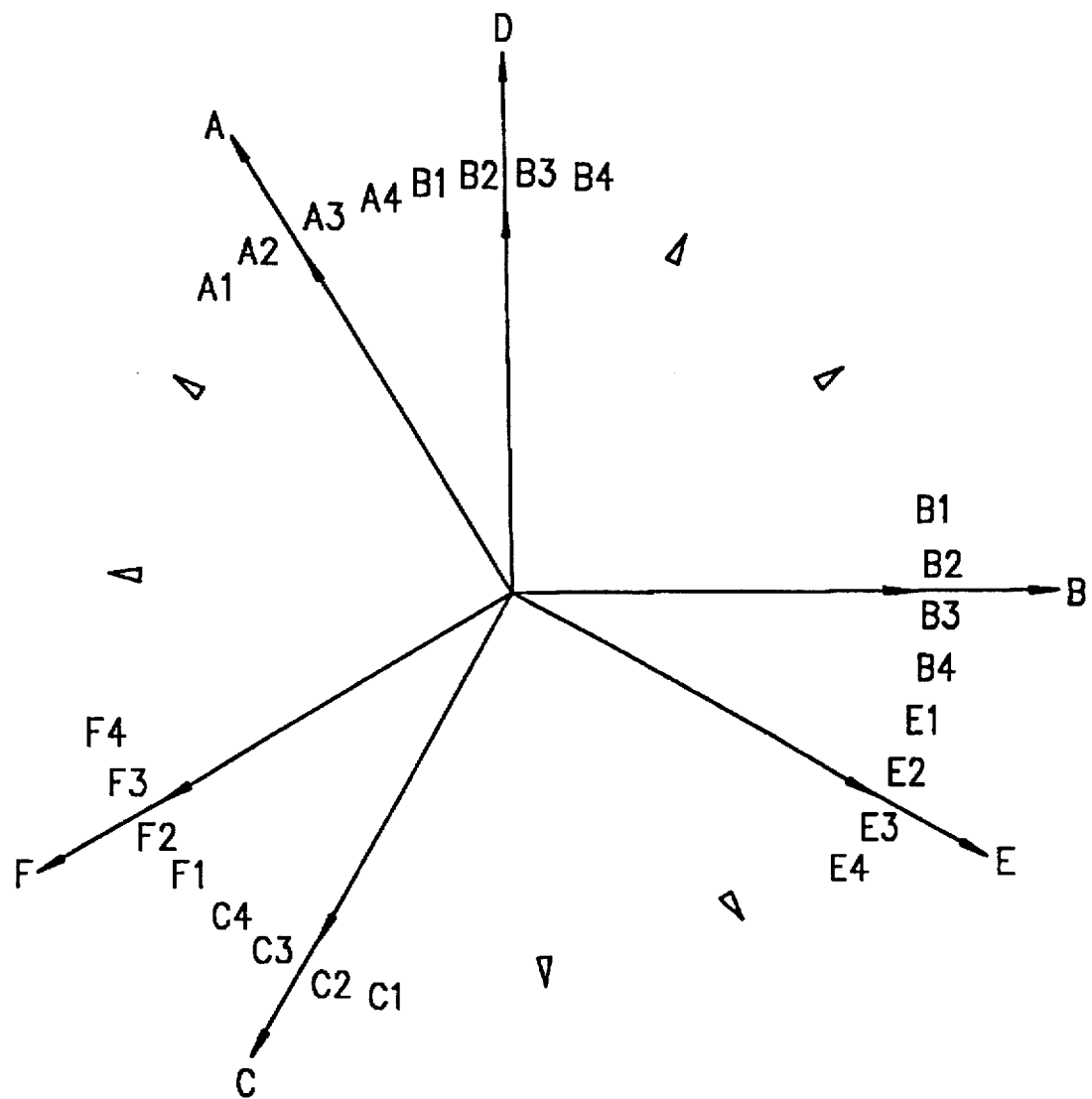

The standard phase displacements between inverter pole output signals during steady state operation are illustrated by the vectors shown in FIG. 19. In accordance with the invention, the standard phase displacement during steady state operation is reduced during a system transient, such as a start-up condition or a system disturbance. This reduction is phase displacement is illustrated by the vectors shown in FIG. 20. As indicated in relation to FIG. 2, the phase displacement reduction operation may be performed as a series of incremental steps. The vectors of FIG. 21 correspond to a fully phased back (0° displacement) output waveform. The phase-back operation shown between FIGS. 19 and 21 can be performed in two discrete steps, in a plurality of steps, or according to feedback received from a flux sensor.

Reducing the phase displacement between inverter pole output signals degrades the quality of the output waveform delivered to the load 38. For example, the forty-eight pulse output waveform produced by the system of FIG. 13 during steady-state conditions is reduced to a twelve pulse output waveform when fully phased back. However, in accordance with the control strategy of the invention, this reduced quality waveform only results during system transients. That is, the reduced quality waveform only exists during start-up and during serious system disturbances. Consequently, steady-state waveforms are still high quality.

Those skilled in the art will appreciate that the size, cost, and weight of interphase transformers can be substantially reduced, in accordance with the invention. These benefits stem from the fact that the phase displacement reduction operation of the invention reduces the maximum flux experienced by an interphase transformer. With a smaller interphase transformer, leakage reactance and the related load current dependent increase in flux in part of the core will also be reduced. By preventing saturation of the interphase transformer core, good current sharing between inputs is preserved and no derating of the inverter is required.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. In a power circuit of the type including a set of interphase transformers and an inverter connected to said set of interphase transformers, said inverter generating a set of inverter pole output signals that are applied to said set of interphase transformers, said set of inverter pole output signals including a first inverter pole output signal and a second inverter pole output signal, said first inverter pole output signal having a predetermined phase displacement from said second inverter pole output signal, the improvement comprising:

a control circuit to identify a system transient, to regulate said inverter such that said inverter reduces said predetermined phase displacement between said first inverter pole output signal and said second inverter pole output signal in response to said system transient, and to restore said predetermined phase displacement between said first inverter pole output signal and said second inverter pole output signal after said system transient.

2. The apparatus of claim 1 wherein said control circuit regulates said inverter to reduce the predetermined phase displacements between a plurality of said inverter pole output signals.

3. The apparatus of claim 2 wherein said control circuit identifies system start-up conditions indicative of said system transient.

4. The apparatus of claim 2 further comprising
a main transformer connected to said interphase transformers to receive the output from said interphase transformers;
a load connected to said main transformer to receive the output from said main transformer; and
a transducer connected to said load and said control circuit, said transducer selectively generating a system disturbance signal indicative of said system transient.

5. The apparatus of claim 4 wherein said set of interphase transformers includes a set of zig-zag interphase transformers connected between said inverter and said main transformer, each zig-zag interphase transformer including at least three modular transformers, a primary of a first modular transformer including a first primary node connected to said main transformer and a second primary node connected to a secondary of another modular transformer, a secondary of said modular transformer with a first secondary node connected to said inverter and a second secondary node connected to a primary of another modular transformer, such that each zig-zag interphase transformer of said set of zig-zag interphase transformers receives at least three inverter pole output signals and generates an average output voltage therefrom for application to said main transformer.

6. A power circuit, comprising:
an inverter generating a set of inverter pole output signals;
a set of interphase transformers connected to said inverter, said set of interphase transformers receiving said set of inverter pole output signals and producing a set of combined inverter pole output signals;
a main transformer connected to said set of interphase transformers, said main transformer receiving said combined inverter pole output signals and producing load output signals; and
a switch firing control circuit including:
a module to execute a standard switch firing scheme to produce a set of inverter pole output signals including a first inverter pole output signal and a second inverter pole output signal, said first inverter pole output signal having a predetermined phase displacement from said second inverter pole output signal,
a module to identify a system transient, and
a module to execute a system transient switch firing scheme such that said inverter reduces said predetermined phase displacement between said first inverter pole output signal and said second inverter pole output signal in the presence of said system transient and restores said predetermined phase displacement between said first inverter pole output signal and said second inverter pole output signal after said system transient.

7. The apparatus of claim 6 wherein said switch firing control circuit regulates said inverter to reduce the predetermined phase displacements between a plurality of said inverter pole output signals.

8. The apparatus of claim 6 wherein said switch firing control circuit identifies system start-up conditions indicative of said system transient.

9. The apparatus of claim 6 further comprising a load connected to said main transformer to receive said load output signals; and a transducer connected to said load and said control circuit, said transducer selectively generating a system disturbance signal indicative of said system transient.

10. The apparatus of claim 6 wherein said set of interphase transformers includes a set of zig-zag interphase transformers connected between said inverter and said main transformer, each zig-zag interphase transformer including at least three modular transformers, a primary of a first modular transformer including a first primary node connected to said main transformer and a second primary node connected to a secondary of another modular transformer, a secondary of said modular transformer with a first secondary node connected to said inverter and a second secondary node connected to a primary of another modular transformer, such that each zig-zag interphase transformer of said set of zig-zag interphase transformers receives at least three inverter pole output signals and generates an average output voltage therefrom for application to said main transformer.

11. A method of operating a voltage sourced inverter, said method comprising the steps of:

generating a set of inverter pole output signals for application to a set of interphase transformers, said set of inverter pole output signals including a first inverter pole output signal and a second inverter pole output signal, said first inverter pole output signal having a predetermined phase displacement from said second inverter pole output signal;

identifying a system transient;

reducing said predetermined phase displacement between said first inverter pole output signal and said second inverter pole output signal in the presence of said system transient; and restoring said predetermined phase displacement between said first inverter pole output signal and said second inverter pole output signal when said system transient is completed.

12. The method of claim 11 wherein said reducing step includes the step of reducing the predetermined phase displacements between a plurality of said inverter pole output signals.

13. The method of claim 11 wherein said identifying step includes the step of identifying system start-up conditions indicative of said system transient.

14. The method of claim 11 wherein said identifying step includes the step of identifying a system disturbance indicative of said system transient.

* * * * *